(12) United States Patent
Heeringa (10) Patent No.: US 11,577,815 B2
(45) Date of Patent: Feb. 14, 2023

(54) ISOGRID PATTERNS FOR STRUCTURAL AIRCRAFT PANELS

(71) Applicant: Bell Textron Inc., Fort Worth, TX (US)

(72) Inventor: Tjepke Heeringa, Dallas, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 464 days.

(21) Appl. No.: 16/777,084

(22) Filed: Jan. 30, 2020

(65) Prior Publication Data

US 2021/0237845 A1 Aug. 5, 2021

(51) Int. Cl.

| B64C 1/12 | (2006.01) |
|---|---|
| B21D 47/00 | (2006.01) |
| B64C 27/00 | (2006.01) |
| B64C 1/06 | (2006.01) |

(52) U.S. Cl.
CPC .............. B64C 1/12 (2013.01); B21D 47/00 (2013.01); B64C 1/061 (2013.01); B64C 27/00 (2013.01)

(58) Field of Classification Search
CPC .. B64C 1/061; B64C 1/12; B64C 1/06; B64C 1/10; B64C 3/26; B64C 2001/0081; B64C 1/18; B64C 1/20; E04C 2/32; E04C 2/324; E04C 2/326; E04C 2002/3422
See application file for complete search history.

(56) References Cited

U.S. PATENT DOCUMENTS

| 6,029,933 A * | 2/2000 | Holman | B64C 1/10 244/129.4 |
|---|---|---|---|
| 6,684,593 B2 * | 2/2004 | Brenneis | B64C 1/12 52/630 |
| 8,517,309 B2 | 8/2013 | Robinson | |
| 9,321,241 B2 * | 4/2016 | Doty | B64C 1/06 |
| 11,186,518 B2 * | 11/2021 | Carleton | G02B 6/0065 |
| 2020/0247083 A1 * | 8/2020 | Ros | B32B 3/28 |

FOREIGN PATENT DOCUMENTS

| DE | 102007046478 A1 * | 11/2008 | ............. B29C 70/86 |
|---|---|---|---|
| EP | 2650120 A2 * | 10/2013 | ............. B29C 65/02 |

OTHER PUBLICATIONS

Amir Ehsani, Jalil Razaeepazhand, Stacking sequence optimization of laminated composite grid plates for maximum buckling load using genetic algorithm, Sep. 28, 2016, International Journal of Mechanical Sciences, 119, 97-106 (Year: 2016).*
Amir Ehsani, Hamid Dalir, Influence of Employing Laminated Isogrid Configuration on Mechanical Behavior of Grid Structures, 2019, Journal of Reinforced Plastics and Composites, 36(16), 777-785 (Year: 2019).*
McDonnell Douglas Astronautics Company, "Isogrid Design Handbook," (NASA-CR-124075) MDC G4295A, Feb. 1973; 252 pages.

* cited by examiner

*Primary Examiner* — Richard Green
*Assistant Examiner* — Madison Elizabeth Dittner
(74) *Attorney, Agent, or Firm* — Akona IP (57) ABSTRACT

One embodiment includes a structural panel for an aerospace vehicle, including a single sheet of material, the material having a first raised pattern on a first side, and a second raised pattern on a reverse side, wherein a repeating portion of the first raised pattern is substantially identical in size and shape to a repeating portion of the second raised pattern, and is rotated at an angle θ to the first raised pattern.

15 Claims, 6 Drawing Sheets

ISOGRID PATTERNS FOR STRUCTURAL AIRCRAFT PANELS

TECHNICAL FIELD

This disclosure relates generally to airframe manufacturing, and more particularly, though not exclusively, to a system and method for providing isogrid patterns for structural aircraft panels.

BACKGROUND

Premium considerations in designing aircraft, including rotary aircraft, fixed-wing aircraft, and aerospace vehicles, include both weight and structural integrity. These considerations may require some design tradeoff, as some design choices that increase structural integrity also increase weight, and some design choices that decrease weight decrease structural integrity.

SUMMARY

In an example, there is disclosed a structural panel for an aerospace vehicle, comprising a single sheet of material, the material having a first raised pattern on a first side, and a second raised pattern on a reverse side, wherein a repeating portion of the first raised pattern is substantially identical in size and shape to a repeating portion of the second raised pattern, and is rotated at an angle θ to the first raised pattern.

In another example, there is disclosed an aerospace vehicle, comprising a motive subsystem; a control subsystem; and an airframe comprising at least one reinforced metal panel comprising an intermediary plane having on opposite faces a first side and a second side, the first and second sides comprising respective first and second pattern features, the first and second pattern features overlaid so that cell wall features of one side substantially intersect interior pocket features of the other side.

In yet another example, there is disclosed a method of manufacturing an aircraft panel, comprising supplying a metal block comprising a first face and an opposing second face; subtracting from the first face selected material to a depth d_1 to form a first repeating geometric pattern; and subtracting from the second face selected material to a depth d_2 to form a second repeating geometric pattern, wherein the first geometric pattern and second geometric pattern are mutually oriented so that walls of the first geometric pattern substantially bisect fields of the first geometric pattern.

DETAILED DESCRIPTION

Among the many considerations that go into the manufacture of an airframe, such as material, composition, shape, corrosive characteristics, and many others, an aircraft designer must make trade-offs between desired features. For example, strength and stiffness are important features in manufacturing parts of an airframe, and in particular in manufacturing the inner grid or "skeleton" of the airframe. Strength and stiffness are important to provide rigidity and structural soundness for the airframe. However, weight is also an important consideration. The more an aircraft weighs, the more fuel is required to power it, the more expensive it is to operate and manufacture, the shorter its range, and other factors.

Thus, in the aeronautical sciences, much study has been devoted to airframe designs that have good stiffness characteristics, and that also are lightweight.

For example, one method of manufacturing panels for use in aircraft includes starting with a block or sheet of material (e.g., a metallic block) with the appropriate length and width, and with a desired thickness, such as a thickness between 2 and 8 inches, by way of illustrative and nonlimiting example. As a solid slab, this panel may have good stiffness characteristics, but may also be quite heavy. One method of reducing the weight is to reduce the thickness of the panel, but in this case the panel is less stiff and more prone to buckling.

Another method is to selectively subtract material from the panel on one or both sides in a repeating geometric pattern. This defines a series of "cells." The total subtracted area may be thought of as a "field" with the edges of the sheet defining the extremities of the field. The interior edges of the geometric pattern divide the large field into a series of smaller "pockets." The larger the size of an individual pocket, the more prone the pocket is to buckling. The smaller the size of the individual pocket, the less prone the pocket is to buckling, but the larger amount of wall material will increase the weight of the panel. It is therefore desirable to identify a geometric pattern that provides the appropriate tradeoff between stiffness and weight (or overall material) considerations. The subtractive process for forming these geometric patterns within the metal panel is popularly machining a single monolithic piece of metal. However, there are other methods of creating such a panel. For example, a panel could be three-dimensionally printed, injection molded, machined, etched, cast, or manufactured by some other process. Furthermore, metal is provided herein as an illustrative example of a popular material for manufacturing airframe components, but this should also be understood to be nonlimiting. Composites, woods, artificial materials, and others could be used in similar processes.

In some cases, it is desirable to stiffen a panel in such a way that the overall panel stiffness is isotropic, or in other words, so that the stiffness is the same regardless of the load angle.

Isotropic surfaces have been studied for decades, and the National Aeronautics and Space Administration (NASA) has provided a handbook known as the "Isogrid Design Handbook," which provides techniques for designing isogrid patterns, particularly for use in aerospace applications such as launch vehicles and spacecraft. NASA Isogrid Design Handbook CR-124075 is incorporated herein by reference.

There are various existing isogrid design techniques. For example, the "classic" or traditional isogrid achieves the isotropic properties by having stiffeners (e.g., cell walls) angled at 60° to each other, forming triangular pockets within the panel. This provides the desired isotropic properties, and in some cases, an identical isogrid pattern is provided on both a first face or side of the panel, and also on a reverse face or side of the panel.

In some cases, improved isotropic properties can be obtained by creating a square stiffening pattern on the panel, with a rotated square stiffening pattern (rotated, e.g., 45° relative to the first pattern) overlaid on the first pattern. Overlaying the first pattern with the second pattern provides, in at least some cases, isotropic properties wherein the cell walls of one grid substantially diagonally bisect the pockets of the other square grid, because of the 45° rotation.

In some embodiments, these overlaid patterns can be provided on the same side of the grid. This provides a strong isotropic grid. However, this may also result in a lot of material and a relatively heavy panel.

In applications where it is desirable to have a lighter panel, similar isotropic properties can be realized by providing only one part of the grid on each side. For example, on a first side, a first geometric pattern is machined into the panel. By way of illustrative example, this may be a square grid, or in other words, a grid of squares. On an opposite face of the panel, a second geometric pattern is etched. This second geometric pattern may have a repeating pattern (e.g., squares) of substantially the same size and shape of a repeating pattern of the first grid. But this grid may be rotated at an angle theta, such as 45°, which orients the two patterns so as to provide an overall isotropic grid formation for the panel. With the second pattern rotated 45° relative to the first pattern, cell walls or stiffeners of the second pattern intersect the pockets of the first pattern. This reinforces those pockets and makes them less likely to buckle. Similarly, the cell walls of the first pattern intersect the pockets of the second pattern, and similarly stiffen those. Thus, with approximately half of the material that would be required to overlay both patterns on both faces, similar stiffness properties can be realized by machining one half of the overall pattern into each face.

Figure 7:
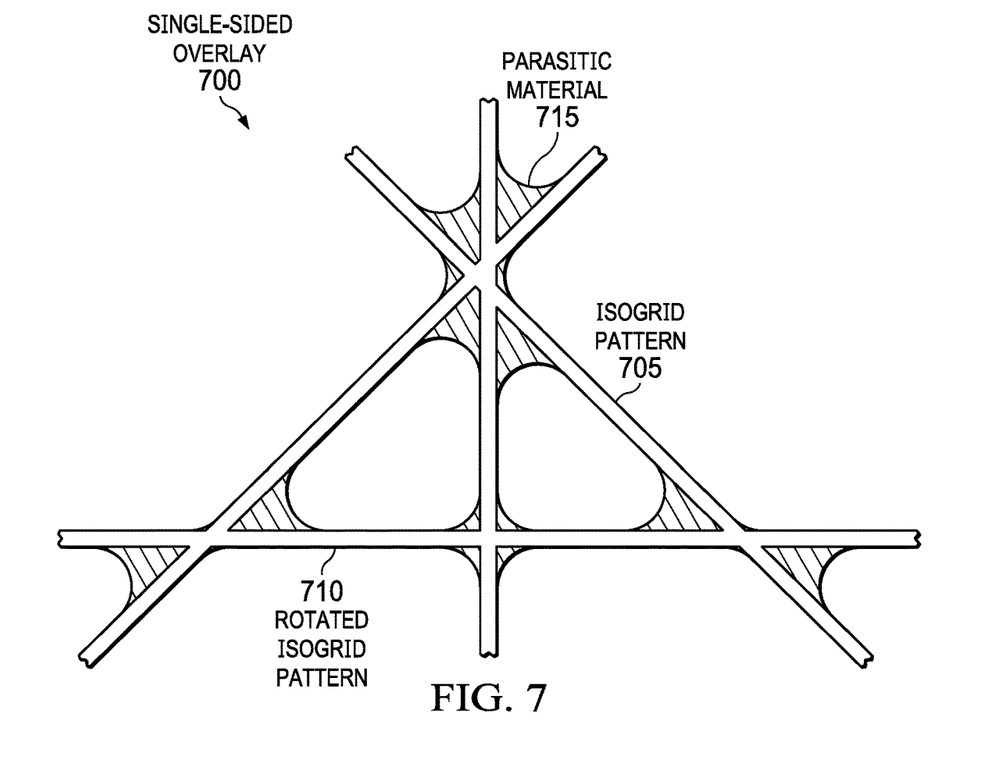
FIG. 7 illustrates a single-sided overlay, according to the teachings of the present specification.

In some of the embodiments illustrated herein, a single geometric pattern, rotated at some angle (such as 45°, 60°, or some other angle) is used. However, this is a nonlimiting example. In other cases, other non-square patterns could be used. For example, other rectangular patterns could be used, or other non-rectangular geometric patterns. In one example, an isogrid could also be used, with one side rotated. In yet another example, different patterns are used on each side. For example, an isogrid could be used on one side, and a square pattern could be used on the reverse side. The square pattern could be oriented to reinforce the isogrid pattern (as illustrated in FIG. 7 below). However, because the complex pattern is not machined on a single side, the manufacturing is greatly simplified, and the pattern can be manufactured at lower cost, with less parasitic material.

Advantageously, this also can result in less parasitic material at the joints. Because machining complex geometric patterns is relatively difficult and expensive, in cases where the two grids overlay each other on the same side, the complex geometric pattern may result in substantial parasitic material at the joints of the overlays. In contrast, by machining simple square grids onto either side, manufacturing is much easier, and there is less parasitic material. As discussed above, the extra parasitic material results in extra weight and lower efficiency for the target aircraft. Thus, putting the stiffening patterns on opposite sides of the panel eliminates complex intersections of the patterns, which would add parasitic material and weight. This parasitic material and added weight are one challenge often faced in designing traditional isogrid stiffening patterns.

Furthermore, putting different stiffener patterns on opposite sides of the panel reduces the effective pocket size, which increases the local buckling resistance of the interlocking web of stiffeners.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
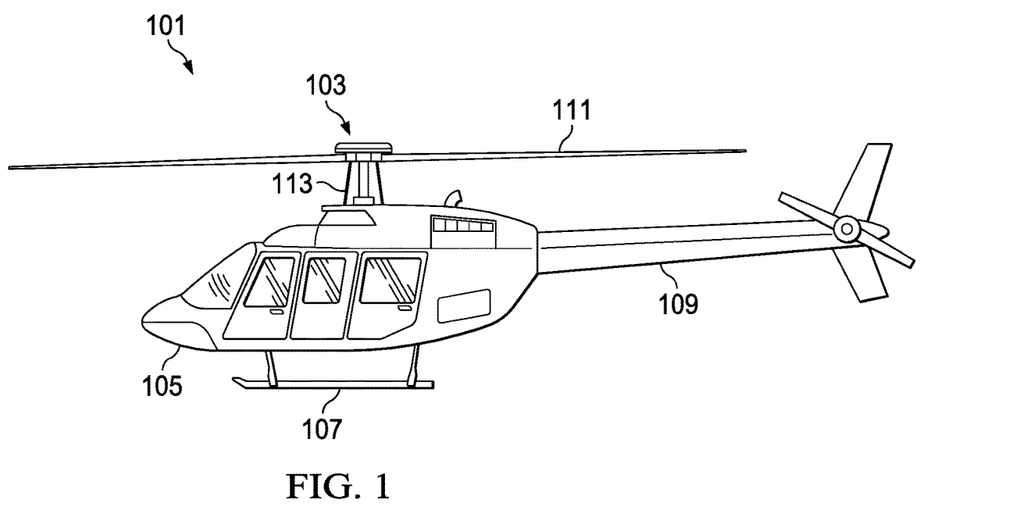
FIGS. 1 and 2 illustrate example aircraft, according to the teachings of the present specification.

FIG. 1 illustrates an example embodiment of a rotorcraft 101. The aircraft illustrated in this embodiment may benefit from improved isogrid patterns on structural members, such as in the airframe. This can provide improved stiffness, while also reducing weight. For example, the isotropic stiffeners discussed in this specification could be used in building at least portions of the skeleton of the airframe of the illustrated aircraft. The reduced weight may result in greater fuel efficiency, greater maneuverability, and other benefits, while the increased stiffness provides greater airframe integrity.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction forms a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer.

Figure 2:
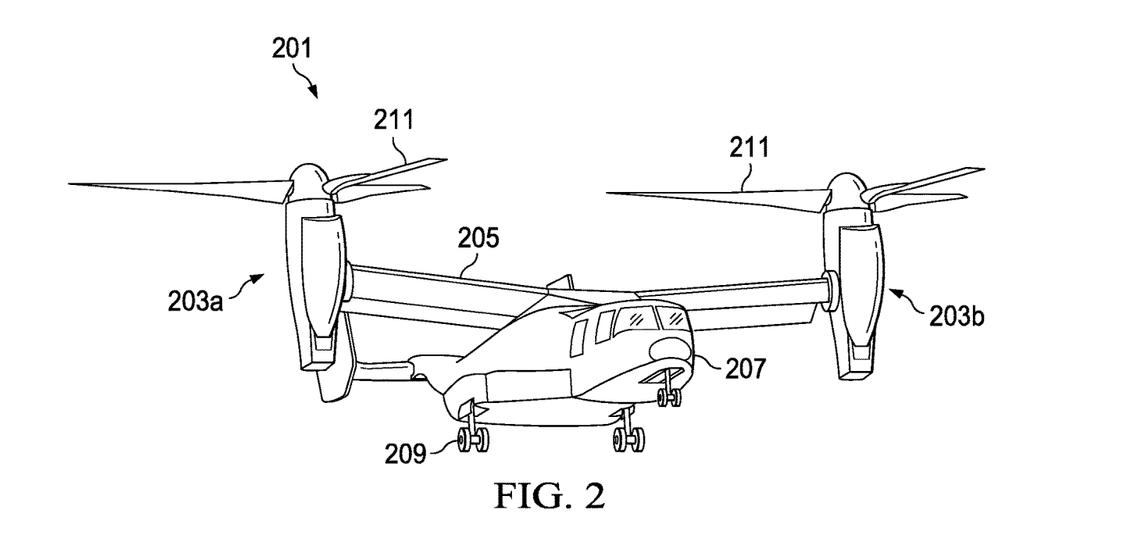

FIG. 2 illustrates a perspective view of an example tiltrotor aircraft 201. The aircraft illustrated in this embodiment may benefit from improved isogrid patterns on structural members, such as in the airframe. This can provide improved stiffness, while also reducing weight. For example, the isotropic stiffeners discussed in this specification could be used in building at least portions of the skeleton of the airframe of the illustrated aircraft.

Tiltrotor aircraft 201 includes nacelles 203a and 203b, a wing 205, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed-wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction forms a control subsystem, which can include manual user controls, as well as computer augmentation to manual user control. Furthermore, in some embodiments, rotorcraft 100 may be an autonomous drone vehicle, or a remote-controlled drone vehicle, in which case some control functions are provided by a computer.

Figure 3:
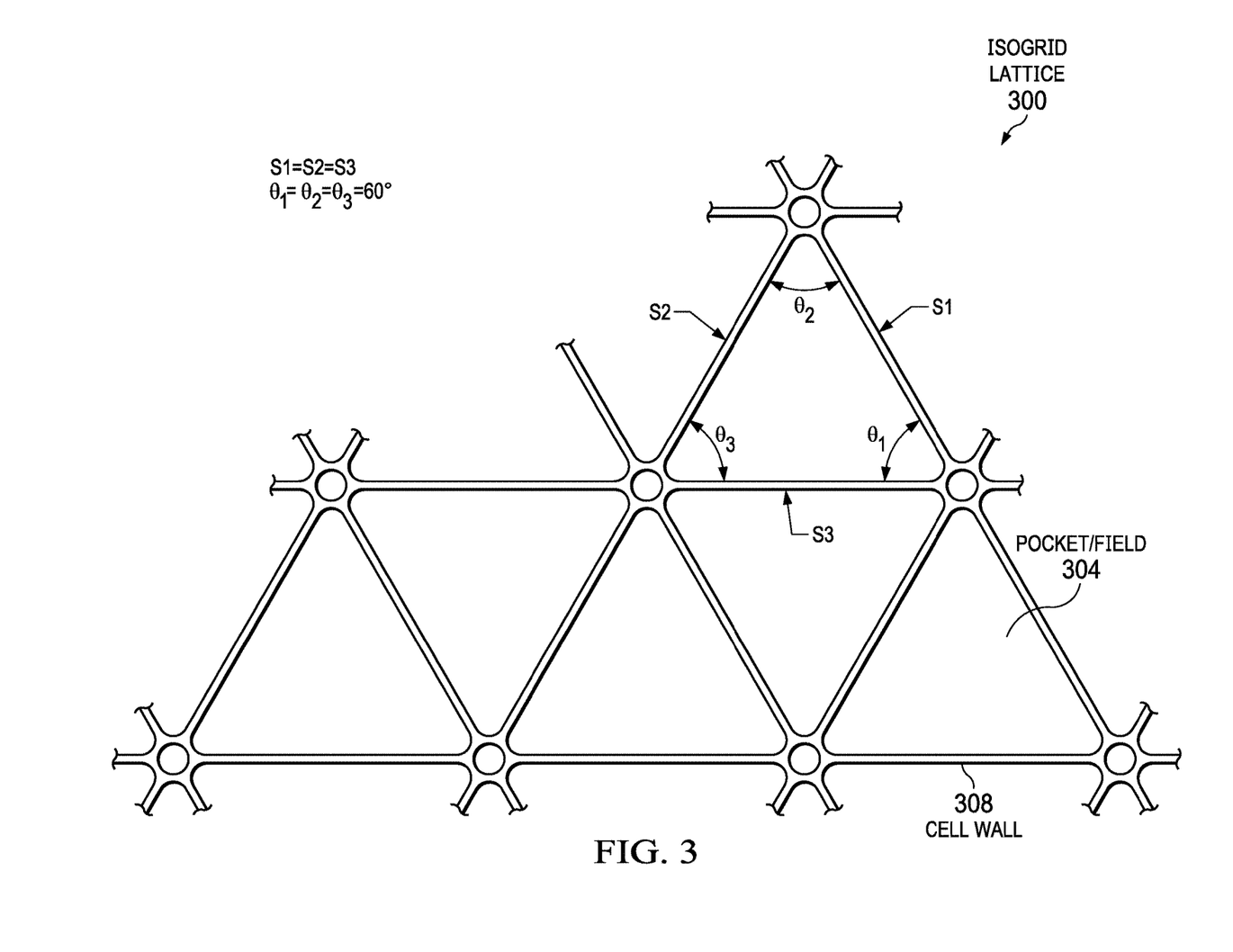
FIG. 3 is a diagrammatic illustration of a traditional isogrid, according to the teachings of the present specification.

FIG. 3 is a diagrammatic illustration of a traditional isogrid. As discussed above, isogrid lattice 300 could be formed by taking a single block material, such as a sheet of metal with a thickness between approximately 2 inches and 8 inches, and subtracting portions to leave the illustrated grid pattern. The subtraction could be achieved by machining, or by some other method.

In this example, isogrid lattice 300 includes a series of equilateral regular triangles. Each triangle has three sides, namely S1, S2, and S3. As a triangle, it also has three angles, namely θ1, θ2, and θ3.

In a traditional isogrid lattice, S1=S2=S3, forming a substantially equilateral triangle. Similarly, θ1=θ2=θ3, with each one equaling exactly 60° within the manufacturing tolerances of the manufacturing process. Each side provides a cell wall 308, defining a pocket or field 304 for each triangle. The lengths of sides S1, S2, and S3, and the resultant size of each pocket or field 304 will depend on the manufacturing considerations of the application. In general, the smaller the size of sides S1, S2, and S3, the smaller the size of pocket 304, and the greater the overall stiffness of the panel. However, this also means that there is more material on the panel, and therefore it will have greater overall weight, and will result in reduced efficiency for the aircraft. Larger sides S1, S2, S3 result in less material on the panel, and thus less weight on the aircraft, but also result in a larger pocket 304, that is therefore more susceptible to buckling. As discussed above, this traditional isogrid pattern may also be relatively complex to manufacture, and may result in more parasitic material.

Figure 4A:
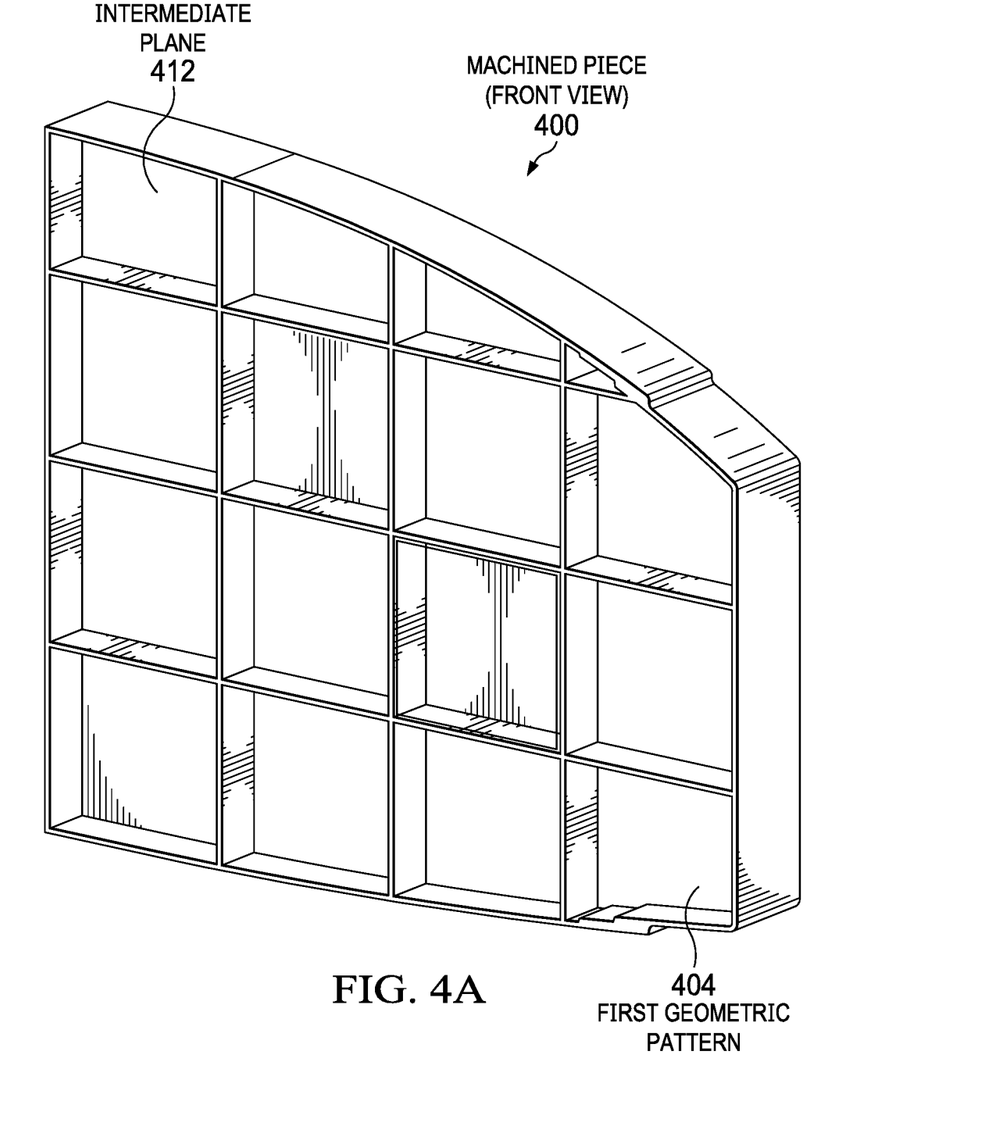
FIGS. 4A and 4B illustrate an embodiment of a panel having an isotropic pattern defined by first and second geometric patterns, according to the teachings of the present specification.
Figure 4B:
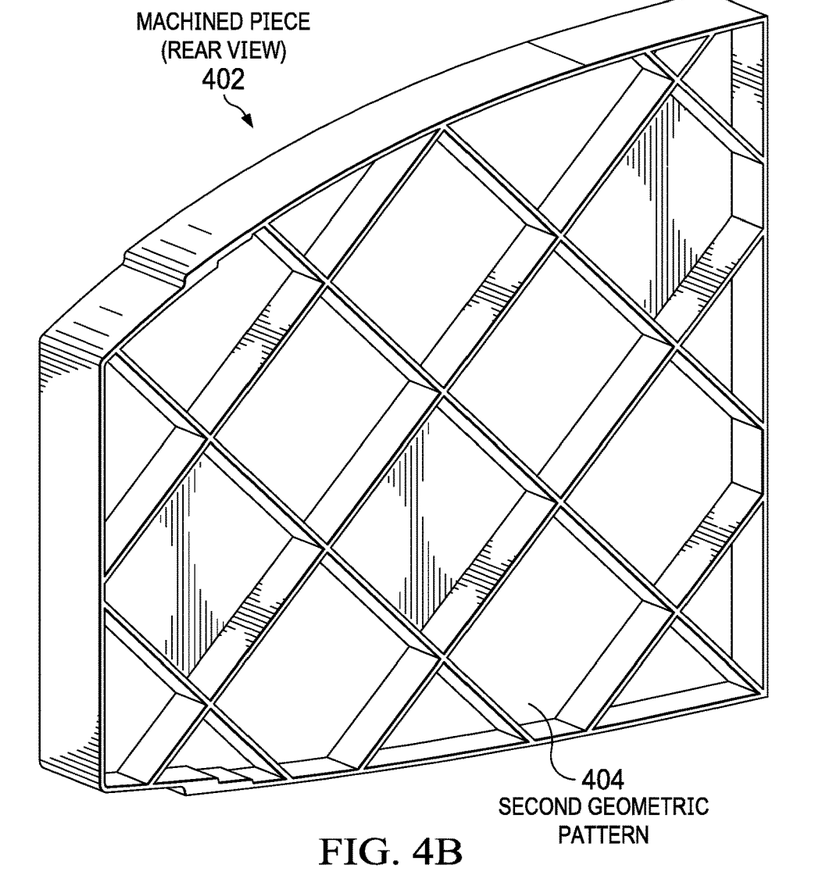

FIGS. 4A and 4B illustrate an embodiment of a panel having an isotropic pattern defined by first and second geometric patterns. As illustrated in FIG. 4A, a first geometric pattern 404 is machined onto a front side 400 of the panel, while a second geometric pattern 408 as illustrated in FIG. 4B is machined onto a reverse side 402 of the same panel.

It should be noted that the designation of first and second or front and back sides of the machined panel is relatively arbitrary, and is provided only by way of illustration to facilitate discussion. In most cases, either side may be referred to as the front or the back side, and either pattern may be referred to as a first or second geometric pattern.

In this case, first geometric pattern 404 and second geometric pattern 408 are both grids of squares. Squares or rectangles are selected as a beneficial design, because they are relatively simple and relatively straightforward to manufacture. This results in lower manufacturing costs, and because of the simplicity of machining square patterns without complex joints, there is less parasitic material at the corners of each square within the first and second geometric patterns 404 and 408. An intermediate plane 412 sits between the two sides. This could be referred to in various embodiments as an intermediate plane, a median plane, or some other designation to indicate that intermediate plane 412 sits between the two machined sides of the panel having the two different geometric patterns. Note that in this embodiment, the two geometric patterns are substantially identical, except for their orientation. First geometric pattern 404 and second geometric pattern 408 are oriented at an angle of approximately 45° to one another to provide the isotropic properties. In other examples, other angles of rotation could be used to achieve other desired properties, or different patterns could be used, as appropriate or as desired. For example, one side could include a traditional isogrid of triangles, while a second side could include a geometric pattern of squares. Other patterns are possible.

Figure 5:
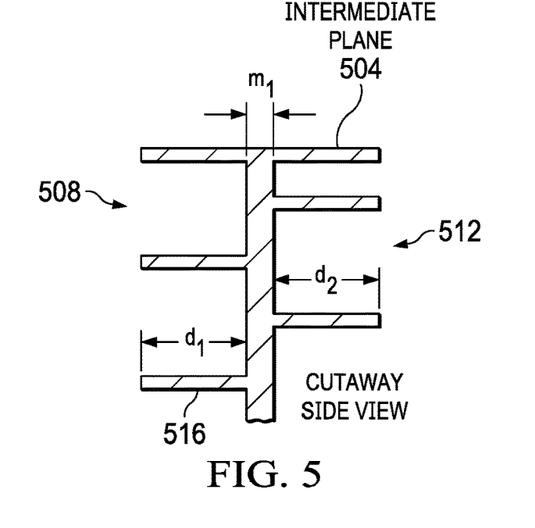
FIG. 5 is a cutaway side view illustrating the relationship of the patterns to one another, according to the teachings of the present specification.

FIG. 5 is a cutaway side view illustrating the relationship of the patterns to one another. As can be seen in this illustration, an intermediate plane 504 divides first side 508 from second side 512. Intermediate plane 504 may be formed simply by machining or etching first side 508 and second side 512 to appropriate depths, while leaving stiffeners or cell walls 516 as illustrated in the desired patterns. In this illustration, first side 508 is machined to a depth $d_1$ and second side 512 is machined to a depth $d_2$, leaving a thickness $m_1$ for intermediate plane 504. The selection of $d_1$, $d_2$, and $m_1$ will depend on the desired properties of the application, including the desired stiffness and weight of the panel. In some embodiments, $d_1=d_2$, so that sides 508 and 512 have substantially identical thickness.

Figure 6:
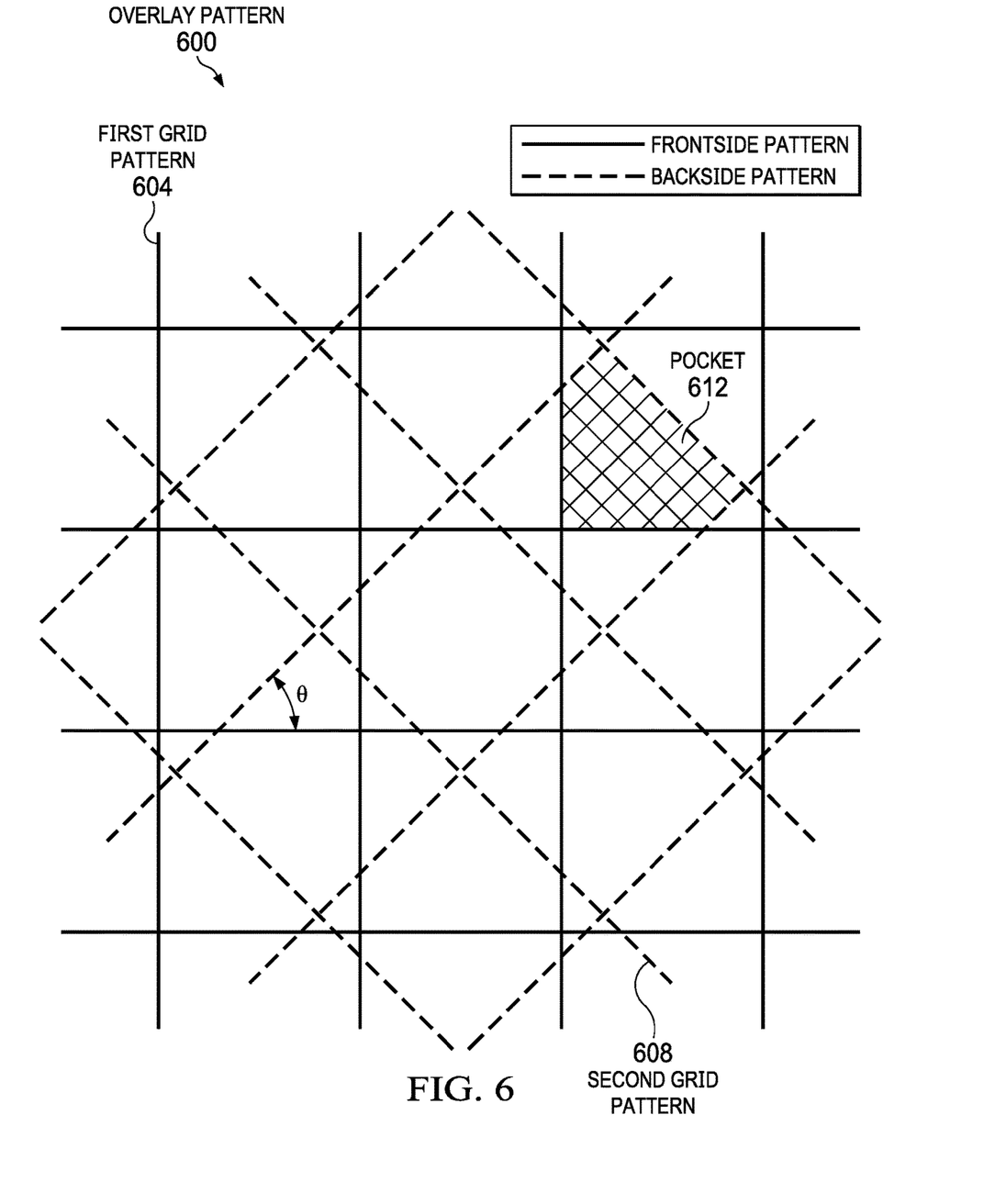
FIG. 6 illustrates an overlay pattern, according to the teachings of the present specification.

FIG. 6 illustrates an overlay pattern 600. In this example, first grid pattern 604 is overlaid on second grid pattern 608. In this case, second grid pattern 608 is rotated at almost exactly 45° with respect to first grid pattern 604. The result is that a number of pockets 612 are defined by the intersections of the two grid patterns. In this example, some pockets 612 are substantially larger than other pockets. This is because the two grids do not perfectly bisect each other. In other cases, the grids could be aligned so that first grid pattern 604 substantially perfectly bisects second grid pattern 608 in two diagonal directions, and vice versa. This would mean that pockets 612 would all be of substantially identical size, within the tolerances of the manufacturing process. Those with skill in the art may design panels with grid orientations to achieve the purposes of a particular deployment. In some examples, perfectly overlaid grids with the two squares perfectly bisecting one another are desirable, while in other cases it may be more desirable to have somewhat irregular pocket sizes.

FIG. 7 illustrates a single-sided overlay 700. Comparing overlay pattern 600 of FIG. 6 to single-sided overlay 700 of FIG. 7, certain advantages can be illustrated. In the case of single-sided overlay 700, it is seen that relatively smaller pockets are still formed by overlaying isogrid pattern 705 with rotated isogrid pattern 710 on the same side of the panel. However, this creates a number of tight and irregular joints within single-sided overlay 700. The result may be substantial parasitic material 715 at these joints. This parasitic material adds to the weight of the panel and to the overall weight of the aircraft, thus reducing efficiency.

Figure 8:
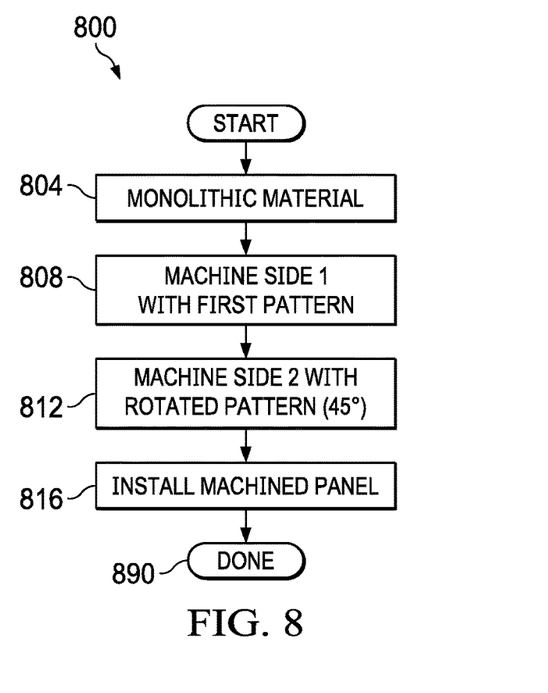
FIG. 8 is a flowchart of a method of manufacturing a two-sided isogrid pattern panel, according to the teachings of the present specification.

FIG. 8 is a flowchart of a method 800 of manufacturing a two-sided isogrid pattern panel. In block 804, the process starts by providing a monolithic block of material, such as a single sheet of metal of appropriate thickness. In many industrial and/or aerospace applications, the desired thickness of the metal may be between 2 and 8 inches. However, other materials of other thicknesses could be used, such as aluminum, titanium, or steel, with thicknesses between 1 and 8 inches.

In block 808, a subtractive process forms the first pattern on a first side of the monolithic block of material. Traditionally, this means machining the pattern into a metal substrate, although as described above, other subtractive methods could be used.

In block 812, a second side is machined with the rotated pattern. For example, as illustrated in FIG. 6, the first pattern could be a geometric grid of squares, while the second pattern could also be a geometric grid of squares, wherein the squares are rotated 45° with respect to the squares of the first pattern. Once the two sides have been machined, then in block 816, the machined panel may be installed in the desired location in the aircraft, or other application.

In block 890, the method is completed.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example a structural panel for an aerospace vehicle, comprising: a single machined sheet of material, the material having a first machined pattern on a first side, and a second machined pattern on a reverse side, wherein a repeating portion of the first machined pattern is substantially identical in size and shape to a repeating portion of the second machined pattern, and is rotated at an angle θ to the first machined pattern.

There is further disclosed an example structural panel, wherein the aerospace vehicle is an aircraft.

There is further disclosed an example structural panel, wherein the aircraft is a rotary aircraft.

There is further disclosed an example structural panel, wherein the structural panel comprises a center plane between the first side and second side, and wherein the first pattern projects a substantially uniform depth $d_1$ from the center plane, and the second pattern projects a substantially uniform depth $d_2$ from the center plane in a reverse direction.

There is further disclosed an example structural panel, wherein $d_1=d_2$ to within a manufacturing tolerance.

There is further disclosed an example structural panel, wherein the repeating portion of the first machined pattern is substantially rectangular.

There is further disclosed an example structural panel, wherein the repeating portion of the second machined pattern is square to within a manufacturing tolerance.

There is further disclosed an example structural panel, wherein $θ≈45°$.

There is further disclosed an example structural panel, wherein the rotated squares of the second pattern are oriented to substantially diagonally double bisect the squares of the first pattern.

There is further disclosed an example structural panel, wherein the rotated squares of the second pattern are oriented to irregularly intersect the squares of the first pattern.

There is also disclosed an example aerospace vehicle, comprising: a motive subsystem; a control subsystem; and an airframe comprising a plurality of reinforced metal panels, the reinforced metal panels having an intermediary plane having on opposite faces a first side and a second side, the first and second sides having respective first and second subtractive pattern features, the first and second pattern features overlaid so that cell wall features of one substantially intersect interior pocket features of the other.

There is further disclosed an example aerospace vehicle, wherein the subtractive pattern is machined.

There is further disclosed an example aerospace vehicle, wherein the subtractive pattern is etched.

There is further disclosed an example aerospace vehicle, wherein the aerospace vehicle is a rotary aircraft.

There is further disclosed an example aerospace vehicle, wherein the first side and the second side have a different repeating pattern.

There is further disclosed an example aerospace vehicle, wherein the first side repeating pattern is an isogrid pattern, and the second side repeating pattern is a square pattern.

There is further disclosed an example aerospace vehicle, wherein the first side and the second side have a similar repeating pattern.

There is further disclosed an example aerospace vehicle, wherein the first side and the second side have an identical repeating pattern to within a manufacturing tolerance.

There is further disclosed an example aerospace vehicle, wherein the identical repeating pattern is a square pattern.

There is further disclosed an example aerospace vehicle, wherein the repeating pattern is machined to minimize parasitic material at angles of the square pattern.

There is also disclosed an example method of manufacturing an aircraft panel, comprising: supplying a metal block having a first face and an opposing second face; subtracting from the first face selected material to a depth $d_1$ to form a first repeating geometric pattern; subtracting from the second face selected material to a depth $d_2$ to form a second repeating geometric pattern, wherein the first geometric pattern and second geometric pattern are mutually oriented so that walls of the first geometric pattern substantially bisect fields of the first geometric pattern.

There is further disclosed an example method, wherein subtracting comprises machining.

There is further disclosed an example method, wherein subtracting comprises etching.

There is further disclosed an example method, wherein the aircraft panel comprises a center plane between the first face and second face, and wherein the first pattern projects a substantially uniform depth $d_1$ from the center plane, and the second pattern projects a substantially uniform depth $d_2$ from the center plane in a reverse direction.

There is further disclosed an example method, wherein $d_1=d_2$ to within a manufacturing tolerance.

There is further disclosed an example method, wherein the first geometric pattern is substantially identical to the second geometric pattern.

There is further disclosed an example method, wherein the geometric pattern is a square.

There is further disclosed an example method, wherein the geometric pattern is an isogrid pattern.

There is further disclosed an example method, wherein the first geometric pattern is different from the first geometric pattern.

There is further disclosed an example method, wherein the first geometric pattern is a square, and the second geometric pattern is an isogrid pattern.

There is further disclosed an example method, wherein subtracting comprises substantially removing parasitic material at joints in the pattern.

There is further disclosed an example method, wherein the first geometric pattern and the second geometric pattern are substantially identical, and wherein the second geometric pattern is rotated at an angle with respect to the first geometric pattern.

There is further disclosed an example method, wherein the angle is approximately 45°.

There is further disclosed an example aircraft panel manufactured according to the process of a number of the above examples.

There is further disclosed an example aircraft comprising a plurality of the aircraft panel illustrated above.

There is further disclosed an example aircraft, wherein the aircraft is a rotary aircraft.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A structural panel for an aerospace vehicle, comprising: a sheet comprising a first raised pattern on a first side, and a second raised pattern on a reverse side, the sheet having a thickness wherein a repeating portion of the first raised pattern is substantially identical in size and shape to a repeating portion of the second raised pattern, and is rotated at an angle θ to the first raised pattern.

2. The structural panel of claim 1, wherein the aerospace vehicle is a rotary aircraft.

3. The structural panel of claim 1, wherein the first raised pattern projects a substantially uniform depth $d\_1$ from the sheet, and the second raised pattern projects a substantially uniform depth $d\_2$ from the sheet in a reverse direction.

4. The structural panel of claim 3, wherein $d\_1=d\_2$ to within a manufacturing tolerance.

5. The structural panel of claim 1, wherein the repeating portion of the first raised pattern is substantially rectangular.

6. The structural panel of claim 1, wherein the repeating portion of the second raised pattern is square to within a manufacturing tolerance.

7. The structural panel of claim 6, wherein θ≈45°.

8. The structural panel of claim 6, wherein the rotated squares of the second raised pattern are oriented to substantially diagonally double bisect the squares of the first raised pattern.

9. The structural panel of claim 6, wherein the rotated squares of the second raised pattern are oriented to irregularly intersect the squares of the first raised pattern.

10. An aerospace vehicle, comprising:
a motive subsystem;
a control subsystem; and
an airframe comprising at least one reinforced metal panel comprising an intermediary sheet having a thickness and on opposite faces a first side and a second side, the first and second sides comprising respective first and second raised pattern features, the first and second pattern features overlaid so that cell wall features of one side substantially intersect interior pocket features of the other side.

11. The aerospace vehicle of claim 10, wherein the first and second pattern features are at least one of machined or etched.

12. The aerospace vehicle of claim 10, wherein the at least one reinforced metal panel is created using at least one of three-dimensional printing, injection molding, and casting.

13. The aerospace vehicle of claim 10, wherein the first pattern feature and the second pattern feature side comprise a different repeating pattern.

14. The aerospace vehicle of claim 13, wherein the first side repeating pattern is an isogrid pattern, and the second side repeating pattern is a square pattern.

15. The aerospace vehicle of claim 10, wherein the first pattern feature and the second pattern feature comprise an identical repeating pattern to within a manufacturing tolerance.

* * * * *